" 
US008583645B2

(12) United States Patent
Treece

(10) Patent No.: US 8,583,645 B2
(45) Date of Patent: Nov. 12, 2013

(54) PUTTING ITEMS INTO CATEGORIES ACCORDING TO RANK

(75) Inventor: Jeffrey C. Treece, West Linn, OR (US)

(73) Assignee: International Business Machines Corporation, Armonk, NY (US)

(*) Notice: Subject to any disclaimer, the term of this patent is extended or adjusted under 35 U.S.C. 154(b) by 1001 days.

(21) Appl. No.: 12/016,439

(22) Filed: Jan. 18, 2008

(65) Prior Publication Data

US 2009/0187571 A1    Jul. 23, 2009

(51) Int. Cl.
*G06F 17/30* (2006.01)
*G06F 7/00* (2006.01)
*G06F 17/10* (2006.01)

(52) U.S. Cl.
USPC .................. 707/737; 707/748; 707/752

(58) Field of Classification Search
USPC .................. 707/737, 999.001–999.005
See application file for complete search history.

(56) References Cited

U.S. PATENT DOCUMENTS

| 5,013,038 | A  | * | 5/1991 | Luxenberg et al. ............. 463/42 |
| 5,583,763 | A  | * | 12/1996 | Atcheson et al. ............. 707/750 |
| 6,721,737 | B2 |   | 4/2004 | Iyengar et al. |
| 6,751,600 | B1 |   | 6/2004 | Wolin |
| 6,763,338 | B2 | * | 7/2004 | Kirshenbaum ............. 706/12 |
| 6,938,053 | B2 |   | 8/2005 | Jaro |
| 7,216,123 | B2 | * | 5/2007 | Kamvar et al. ........ 707/999.005 |
| 7,346,604 | B1 |   | 3/2008 | Bharat et al. |
| 2002/0099694 | A1 | * | 7/2002 | Diamond et al. ............. 707/3 |
| 2002/0120619 | A1 |   | 8/2002 | Marso et al. |
| 2003/0037074 | A1 | * | 2/2003 | Dwork et al. ............. 707/500 |
| 2003/0069878 | A1 |   | 4/2003 | Wise |
| 2003/0173743 | A1 | * | 9/2003 | Brink et al. ............. 273/297 |
| 2003/0191726 | A1 | * | 10/2003 | Kirshenbaum ............. 706/12 |
| 2004/0267600 | A1 |   | 12/2004 | Horvitz |

(Continued)

FOREIGN PATENT DOCUMENTS

WO    0131506 A2    5/2001

OTHER PUBLICATIONS

Dym CL, Wood WH, Scott MJ (2002) Rank ordering engineering designs: pairwise comparison charts and borda counts. Res Eng Des 13:236-242.*

(Continued)

*Primary Examiner* — Jacob Betit
*Assistant Examiner* — Kannan Shanmugasundaram
(74) *Attorney, Agent, or Firm* — Yudell Isidore Ng Russell PLLC

(57) ABSTRACT

A method, system, and computer program product for putting items into categories according to rank. The method divides the (unranked) items into a plurality of groups. The method then performs a first ranking of the items in each group, such that each item has a set of befores and a set of afters. A set of befores is the set of items that are ranked higher than an item; a set of afters is the set of items that are ranked lower than an item. The method selects at least one set of items for a subsequent ranking. The method then performs the subsequent ranking of the items of the selected set of items. The method then cascades the befores and afters of the items of the selected set of items according to the subsequent ranking. The method then determines which, if any, of the items are categorized and removes any categorized items from consideration. The method repeats the selecting, subsequent ranking, cascading, and determining steps all items have been categorized.

16 Claims, 4 Drawing Sheets

(56) References Cited

U.S. PATENT DOCUMENTS

| | | | |
|---|---|---|---|
| 2005/0050077 A1 | 3/2005 | Li et al. | |
| 2005/0154746 A1* | 7/2005 | Liu et al. | 707/101 |
| 2005/0289140 A1 | 12/2005 | Ford et al. | |
| 2006/0242147 A1 | 10/2006 | Gehrking et al. | |
| 2007/0099683 A1* | 5/2007 | Panther Trice et al. | 463/1 |
| 2007/0150365 A1 | 6/2007 | Bolivar | |
| 2007/0192293 A1* | 8/2007 | Swen | 707/3 |
| 2008/0254436 A1* | 10/2008 | Morgia et al. | 434/362 |

OTHER PUBLICATIONS

Olariu, S. et al. "How to Sort N Items Using a Sorting Network of Fixed I/O Size" IEEE Transactions on Parallel and Distributed Systems, Vol. 10, No. 5, May 1999, pp. 487-499.

Deshpande, M. et al. "Item-Based Top-N Recommendation Algorithms" University of Minnesota, Minneapolis, Jan. 20, 2003, pp. 1-23.

Massey, Kenneth, "Massey Ratings Description", Massey Ratings, Aug. 15, 2000.

Greenwald, Amy et al, "Quickrank: A Recursive Ranking Algorithm", Dept. of Computer Science, Brown University, 2006.

Dwork, C. et al., "RANk Aggregation Methods for the Web", WWW10, May 1-5, 2001, Hong Kong.

Bharat, K., et al., "Hilltop: A Search Engine Based on Expert Documents", COMPAQ, Systems Research Center, Palo Alto, CA, 2005.

Emerson, John W., "The Computer: A Phantom Figure Skating Judge?", Yale University, Feb. 11, 2006, Torino Italy.

* cited by examiner

|    | 1 | 2 | 3 | 4 | 5 | 6 | 7 | 8 | 9 | 10 | 11 | 12 | 13 | 14 | 15 | 16 | 17 | 18 | ... |
|----|---|---|---|---|---|---|---|---|---|----|----|----|----|----|----|----|----|----|-----|
| 1  | - | a | a | a | a | a |   |   |   |    |    |    |    |    |    |    |    |    |     |
| 2  | b | - | a | a | a | a |   |   |   |    |    |    |    |    |    |    |    |    |     |
| 3  | b | b | - | a | a | a |   |   |   |    |    |    |    |    |    |    |    |    |     |
| 4  | b | b | b | - | a | a |   |   |   |    |    |    |    |    |    |    |    |    |     |
| 5  | b | b | b | b | - | a |   |   |   |    |    |    |    |    |    |    |    |    |     |
| 6  | b | b | b | b | b | - |   |   |   |    |    |    |    |    |    |    |    |    |     |
| 7  |   |   |   |   |   |   | - | a | a | a  | a  |    |    |    |    |    |    |    |     |
| 8  |   |   |   |   |   |   | b | - | a | a  | a  |    |    |    |    |    |    |    |     |
| 9  |   |   |   |   |   |   | b | b | - | a  | a  |    |    |    |    |    |    |    |     |
| 10 |   |   |   |   |   |   | b | b | b | -  | a  |    |    |    |    |    |    |    |     |
| 11 |   |   |   |   |   |   | b | b | b | b  | -  |    |    |    |    |    |    |    |     |
| 12 |   |   |   |   |   |   |   |   |   |    |    | -  | a  | a  | a  | a  |    |    |     |
| 13 |   |   |   |   |   |   |   |   |   |    |    | b  | -  | a  | a  | a  |    |    |     |
| 14 |   |   |   |   |   |   |   |   |   |    |    | b  | b  | -  | a  | a  |    |    |     |
| 15 |   |   |   |   |   |   |   |   |   |    |    | b  | b  | b  | -  | b  |    |    |     |
| 16 |   |   |   |   |   |   |   |   |   |    |    | b  | b  | b  | b  | -  |    |    |     |
| 17 |   |   |   |   |   |   |   |   |   |    |    |    |    |    |    |    | -  | a  | ... |
| 18 |   |   |   |   |   |   |   |   |   |    |    |    |    |    |    |    | b  | -  | ... |
| ...|   |   |   |   |   |   |   |   |   |    |    |    |    |    |    |    |... |... | ... |

FIG. 2

PUTTING ITEMS INTO CATEGORIES ACCORDING TO RANK

BACKGROUND OF THE INVENTION

1. Technical Field

The present invention relates generally to the field of categorization of items, and more particularly to a method of putting items into categories according to rank.

2. Description of the Related Art

Putting items into categories is a common problem. One example is the awarding of blue, red, or yellow ribbons to State fair entries. The number of entries may be so large that it is impractical to judge them all in one session. Assigning a quantitative score may be impractical in that it may be difficult or impossible to equate numbers to subjective determinations. Another example is an essay contest in which a judge must read and compare each essay. If the number of essays is large, it may exceed the limits of human retention to be able to read all of the essays and sort them appropriately. Also, in situations where there are so many entries as to require multiple judges, it may be difficult or impossible to combine fairly the results of the various judges.

There are numerous other examples of situations in which items must be categorized. For example, organizations typically rank employees as top performers and bottom performers. Professors must grade large numbers of essay exams. Colleges may rank applicants for immediate acceptance, normal acceptance, and deferred acceptance. In technology, suppose a software product has far too many defects to be realistically fixed within a current release. However, the developer may wish to fix the top 30 defects from a huge list having the most customer impact. No single person is able to pour through all the defects on the list and rank them in any practical timeframe.

SUMMARY OF THE INVENTION

The present invention provides a method of putting items into categories according to rank. In one embodiment of the present invention, the method divides the items into a plurality of groups. The method then performs a first ranking of the items in each group, such that each item has a set of befores and a set of afters. A set of befores is the set of items that are ranked higher than an item; a set of afters is the set of items that are ranked lower than an item. The method selects at least one set of items for a subsequent ranking. The method then performs the subsequent ranking of the items of the selected set of items. The method then cascades the befores and afters of the items of the selected set of items according to the subsequent ranking. The method then determines which, if any, of the items are categorized and removes any categorized items from consideration. The method repeats the selecting, subsequent ranking, cascading, and determining steps until each item has been put into a category.

In some embodiments, the method selects items for subsequent ranking according to a what-if scoring methodology. Generally, a what-if scoring methodology determines which set of items will yield a maximum amount of new information upon performing the subsequent ranking. In certain embodiments, the method calculates, for a pair of items i and j, the following sets:

Diff1=i.afters−j.afters;
Diff2=i.befores−j.befores;
Diff3=j.afters−i.afters; and,
Diff4=j.befores−i.befores;

wherein:
Diff is the set-wise difference or complement operator, which yields for sets A and B the elements of set A less any common elements of sets A and B, denoted as Diff(A,B)=A−B;
i.afters is the set of afters for item i;
j.afters is the set of afters for item j:
i.befores is the set of befores for item i; and,
j.befores is the set of befores for item j.

The method then calculates, for pair i and j a first score and second score according to the equations:

score1=(length of Diff1)+(length of Diff4); and.

score2=(length of Diff2)+(length of Diff3);

wherein:
length of Diff1 is the number of items in set Diff1;
length of Diff2 is the number of items in set Diff2;
length of Diff3 is the number of items in set Diff3; and,
length of Diff4 is the number of items in set Diff4.

The method then determines, for pair i and j, a maximum score and a minimum score according to the equations:

minscore=min(score1,score2); and, maxscore=max(score1,score2).

Some embodiments of the present invention use a pessimistic, or worst case, what-if scoring methodology, wherein the minimum score is weighted more heavily than the maximum score. For example, score(i,j)=(0.99×minscore)+(0.01×maxscore). The method selects for subsequent ranking the items yielding the highest pairwise scores.

Embodiments of the present invention cascade the befores and afters of the items of the selected set of items according to the subsequent ranking using a principle of inheritance. According to inheritance, the method adds item j and the set j.afters to the set i.afters, and adds item i and the set i.befores to the set j.befores, if item i is ranked before item j in the subsequent ranking. The method adds item i and the set i.afters to the set j.afters, and adds item j and the set j.befores to the set i.befores, if item j is ranked before item i in the subsequent ranking. The method determines if an item is characterized by determining if item i is guaranteed to be in exactly one of the categories based upon the number of items in at least one of sets i.afters and i.befores.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIG. 2 illustrates an embodiment of a data structure according to the present invention;

DETAILED DESCRIPTION OF THE PREFERRED EMBODIMENT

Figure 1:
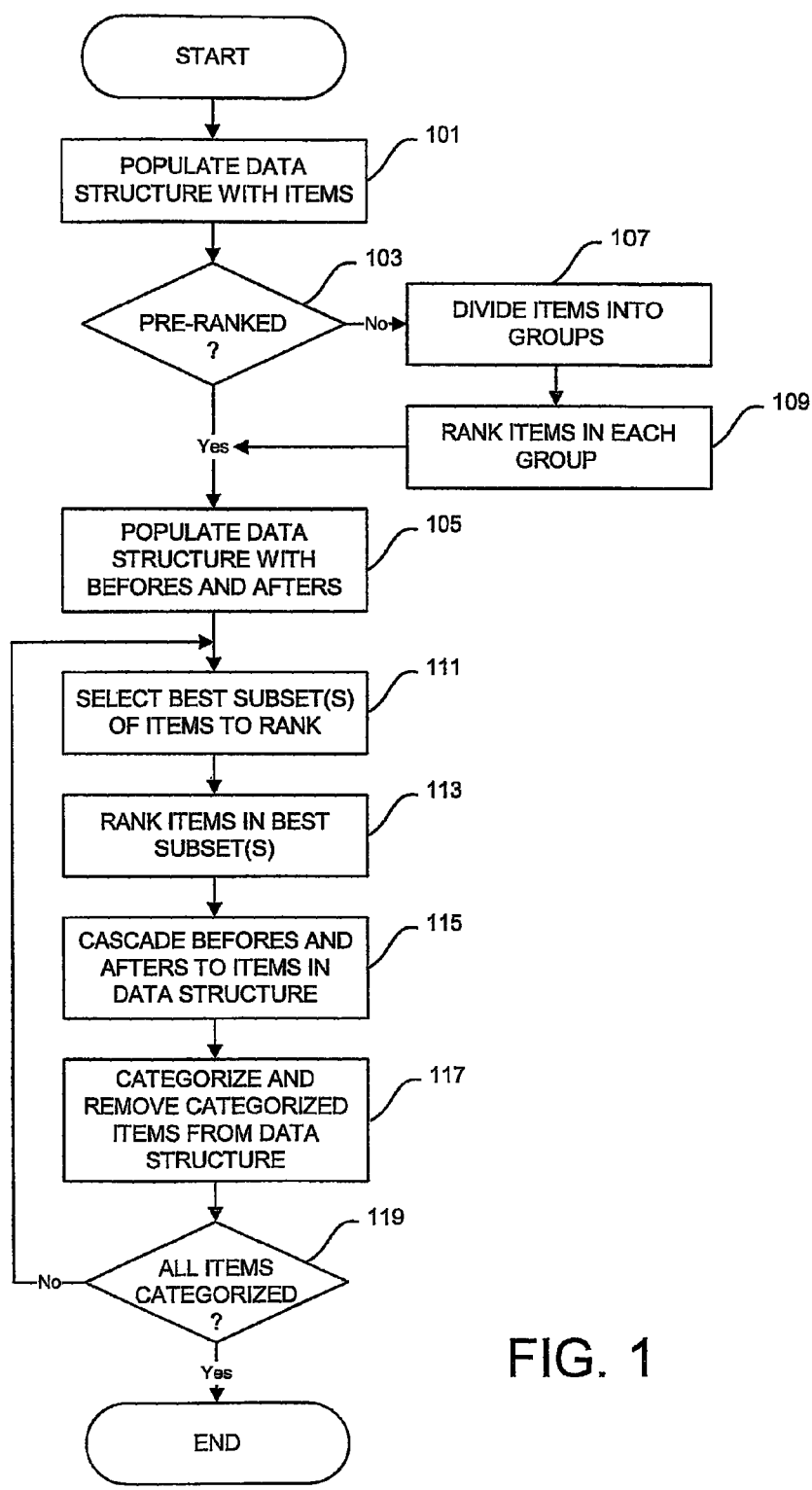
FIG. 1 is a flow chart of an embodiment of a method according to the present invention.

FIG. 1 is a flow chart of an embodiment of the method according to the present invention. FIG. 1 includes both human-performed and computer-performed steps. The computer-performed steps may be performed on any computer programmed according to the present invention. A data structure is populated with items, as indicated at block 101. Items according to the present invention represent objects to be categorized. Objects may include people, essays, contest entries, or any other things that may be ranked and categorized.

An example of a data structure is illustrated in FIG. 2. The data structure of FIG. 2 is in the form of a two-dimensional matrix in which items are identified by Index numbers. Those skilled in the art will recognize that other identifiers may be used in connection with items. The data structure illustrated in FIG. 2 contains initial rankings of various groups or sets of items. Each row of the data structure sets out the ranking of a particular item. Items that are ranked after (i.e. lower than) a particular item are identified by the letter a. Items that are ranked before (i.e. higher than) a particular item are identified by the letter b. For example, in the initial ranking, items 1, 2, and 3 are ranked before (higher than) item 4, and items 5 and 6 are ranked after (lower than) item 4. The set of items ranked after an item i will be denoted as i.afters and the set of items ranked before item i are denoted as i.afters. Thus, in the initial rankings, 4.afters is the set $\{5, 6\}$ and 4.befores is the set $\{1, 2, 3\}$. As processing according to the present invention proceeds, items will be added to the sets of befores and afters.

Items may be initially pre-ranked or unranked. Referring again to FIG. 1, if, as determined at decision block 103, the items are pre-ranked, the data structure is populated with befores and afters according to the pre-ranking, as indicated at block 105, and as illustrated for example in FIG. 2. If the items are not pre-ranked, then, the items are divided into groups, as indicated at block 107, and the items in each group are ranked, as indicated at block 109. For example, if there are 100 items to be categorized and one person can effectively rank 10 items, the items would be divided into 10 groups of 10 each. It should be recognized, however, that all groups do not need to be of the same size. For example, one ranker may be given six items to rank while another ranker may be given 12 items.

After the items have been ranked at block 109, the data structure is populated with befores and afters at block 105. As indicated generally at block 111, the method performs the computer implemented step of selecting the best subset or subsets of items to rank. In order to select the best subset or subsets of items to rank, embodiments of the method of the present invention perform a what-if scoring analysis of the pairs of items in a potential subset or subsets of items to rank. In what-if scoring, pairs are chosen so as to provide the most new information after ranking. If an item a is ranked before an item b, item a will inherit the set b.afters from item b and item b will inherit the set a.befores from item a. The new information provided if item a is before item b comprises the set b.afters, less any common elements of sets b.afters and a.afters, and the set a.befores, less any common elements of the sets a.befores and b.befores. Similarly, if item b is ranked before item a, then item b will inherit the set a.afters from item a and item a will inherit the set b.befores from item b. The new information provided if item b is before item a comprises the set a.afters, less any common elements of sets a.afters and b.afters, and the set b.befores, less any common elements of the sets a.befores and b.befores.

The set operation yielding elements of a set A, less any common elements of sets A and B, is the set-wise difference or complement, which is denoted as Diff(A,B)=A−B. An embodiment of the present invention calculates what-if scores using the following equations:

$$Diff1 = a.afters - b.afters$$

$$Diff2 = a.befores - b.befores$$

$$Diff3 = b.afters - a.afters$$

$$Diff4 = b.befores - a.befores$$

Scores according to an embodiment of the present invention are calculated as follows:

$$score1 = (\text{length of Diff1}) + (\text{length of Diff4})$$

$$score2 = (\text{length of Diff2}) + (\text{length of Diff3})$$

Length is the number of elements in a set. Thus, Score1 represents the new information that will be determined if item a is ranked before item b. Score 2 represents the new information that will be determined if item b is ranked before item a.

A preferred embodiment of the method of the present invention uses a pessimistic what-if scoring methodology in which the worst case score is weighted more heavily than the best case score in determining which pairs to use in the ranking.

$$minscore = min(score1, score2)$$

$$maxscore = max(score1, score2)$$

According to an embodiment of the pessimistic what-if scoring methodology $$score = 0.99 \times minscore + 0.01 \times maxscore$$

The set of items to rank comprises the pairs yielding the highest pessimistic what-if scores.

Figure 4:
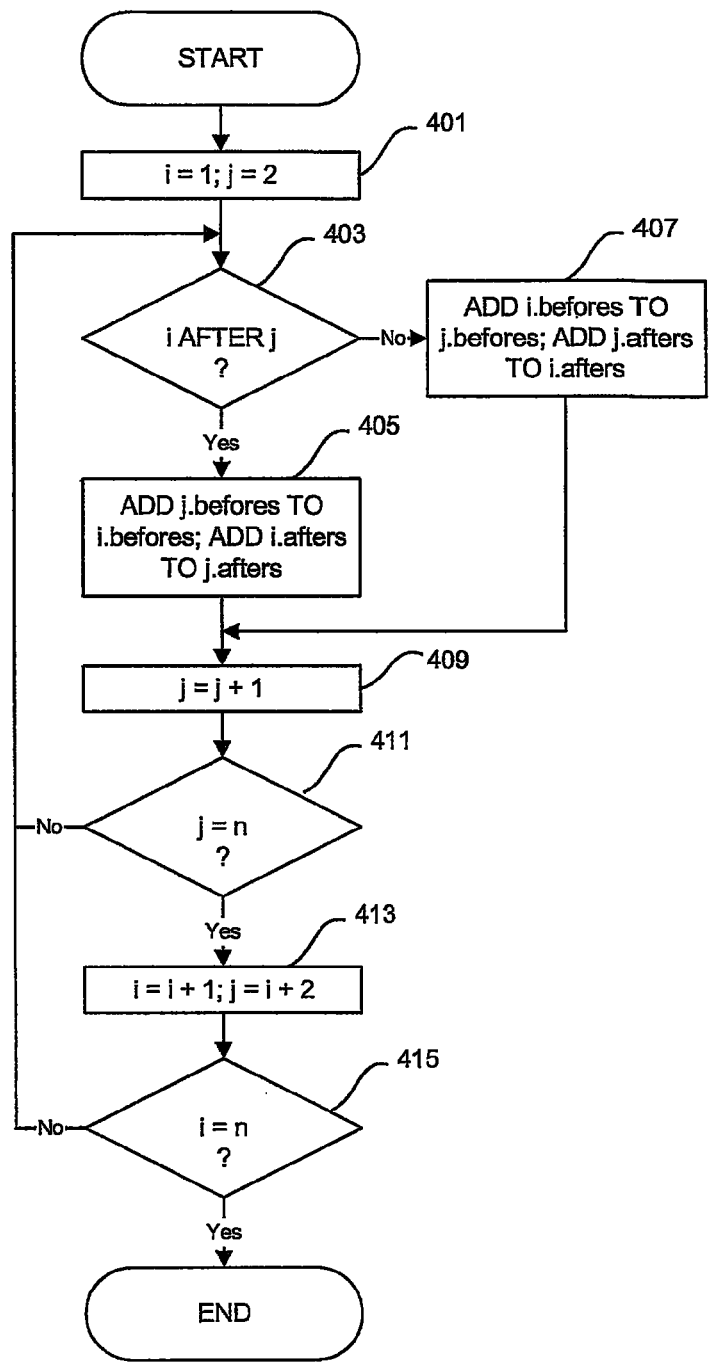

A flow chart of an embodiment of pessimistic what-if scoring is illustrated in FIG. 4. First, the program sets index i and index j each equal to 1, as indicated at block 301. Index i is a row index and index j is a column index. If, as determined at decision block 303, index i is equal to N, where N is last index, processing ends. If, index i is not equal to end, the program determines, at decision block 305 if index i is in the data structure. As will be explained in detail hereinafter, when an item is categorized, that item is removed from the data structure. If item i is not in the data structure, i is incremented, at block 307, and processing returns to decision block 303. If item i is in the data structure, the program determines, at decision block 309, if index j is equal to N. if so, the program sets i=i+1 and j=1, at block 311, and processing returns to decision block 303. If index j is not equal to N, the program determines, at decision block 313, if item j is in the data structure. If not, the program increments index j, at block 315 and processing returns to decision block 309. If item j is in the data structure, the program determines, at decision block 317, if index i is equal to index j. If so, the program increments index j, at block 315, and processing returns to decision block 309. If, as determined at decision block 317, index i is not equal to index j, the program performs pessimistic what-if scoring on items i and j.

As indicated at block 319, the program calculates the various set differences or complements using the equations:

$$Diff1 = a.afters - b.afters;$$

$$Diff2 = a.befores - b.befores;$$

$$Diff3 = b.afters - a.afters;$$

$$Diff4 = b.befores - a.befores.$$

Then, as indicated at block 321, the program calculates score1 and score2 as follows:

score1=(length of Diff1)+(length of Diff4)

score2=(length of Diff2)+(length of Diff3)

Then, as indicated at block 323, the program determines minscore and maxscore as follows:

minscore=min(score1,score2)

maxscore=max(score1,score2)

Finally, as indicated at block 325, the program calculates score(i,j) as follows:

score(*i,j*)=0.99×minscore+0.01×maxscore

Then, the program returns score(i,j), at block 327, and sets i=i+1 and j=1, at block 329. Processing according to FIG. 3 continues until all pairs of items have been scored.

Figure 3:
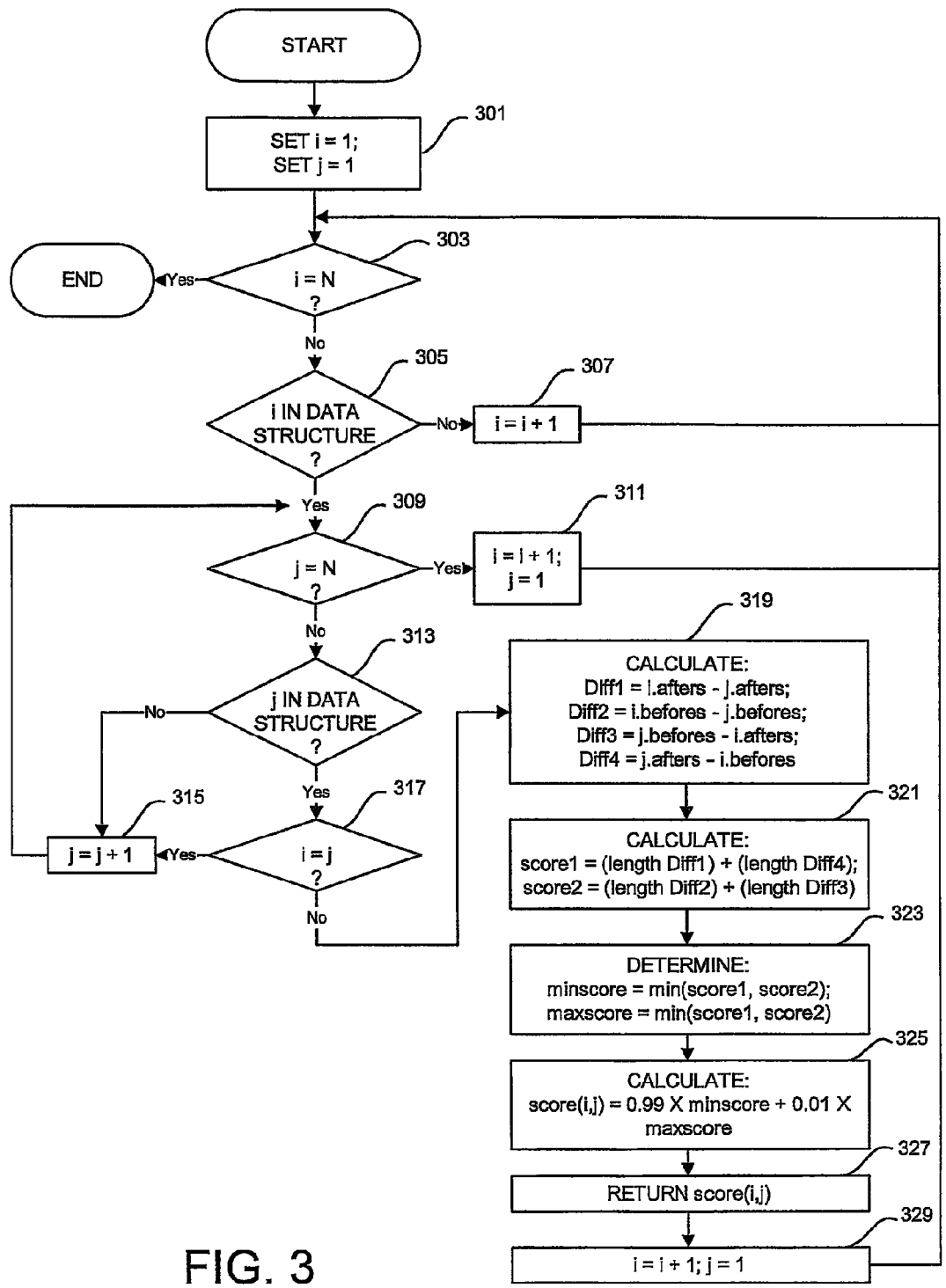
FIG. 3 is a flow chart of an embodiment of a pessimistic what-if scoring methodology according to the present invention; and, FIG. 4 is a flow chart of an embodiment of cascading befores and afters according to the present invention.

It should be recognized that FIG. 3 illustrates only one example of what-if scoring according to the present invention. In FIG. 3, all pairs in the data set are scored. For large data sets, the time required to score all pairs may be deemed to be excessive. In some embodiments, it may be preferable to score only some pairs. For example, a subset of pairs, selected for example at random, may be scored in order to find a subsequent set of items to rank.

Returning to FIG. 1, as indicated at block 113, the items in the best subset or subsets are then ranked. In one embodiment, the ranking at block 113 may be performed by one or more human rankers using subjective criteria. After ranking at block 113, the new rankings are input to the computer. The program cascades the befores and afters to the items in the data structure, as indicated at block 115. Cascading according to the present invention uses a principal of inheritance. If an item a is ranked before an item b, item a will inherit the set b.afters from item b and item b will inherit the set a.befores from item a. Similarly, if item b is ranked before item a, then item b will inherit the set a.afters from item a and item a will inherit the set b.befores from item b.

An embodiment of cascading according to the present invention is illustrated in FIG. 4. The program sets index i equal to one and index j equal to two, as indicated at block 401. If, as determined at decision block 403, item i is ranked after item j, the program adds the elements of the set j.belows to the set i.belows, and adds the elements of the set i.aboves to the set j.aboves, at block 405. If as determined at decision block 403, item i is not ranked after item j, the program adds the elements of the set i.belows to the set j.belows, and adds the elements of the set j.aboves to the set i.aboves, at block 407. Then, the program increments index j at block 409. The program tests, at decision block 411, if j=n, where n is number of items ranked. If not, processing returns to decision block 403. If j=n, then the program sets i=i+1 and j=i+2, at block 413. The program tests, at decision block 415, if i=n. If not, processing returns to decision block 403. If i=n, cascading processing ends.

After cascading the befores and afters from the ranking, the computer categorizes the items and removes any categorized items from the data structure, as indicated at block 117. An item is categorized when its set of befores and/or afters guarantees that it is in exactly one category. For example, consider the categorization of 100 items into a top 50% and a bottom 50%. If the set i.aboves has a length equal to or greater than 50, then item i is in the bottom 50%. If the set i.belows has a length equal to or greater than 50, then item i is in the top 50%.

As another example, consider the categorization of 100 items into quartiles. If the set i.aboves has a length equal to or greater 75, then item i is in the fourth quartile. If the set i.belows has a length equal to or greater than 75, then item i is in the first quartile. If the set i.aboves has a length equal to or greater than 25 and the set i.belows has a length equal to or greater than 50, then item i is in the second quartile. If the set i.aboves has a length equal to or greater than 50 and the set i.belows has a length equal to or greater than 25, then item i is in the third quartile.

As yet another example, consider the categorization of 100 items into a top 10%, a bottom 10%, and a middle 80%. If the set i.aboves has a length equal to or greater 90, then item i is in the bottom 10%. If the set i.belows has a length equal to or greater than 90, then item i is in the top 10%. If the set i.aboves has a length equal to or greater than 10 and the set i.belows has a length equal to or greater than 10, then item i is in the middle 80%.

Any item for which there is insufficient information to categorize it into exactly one category remains in the data set. It should be noted that it is not necessary that an item's position within a category be determined. After the item is known to be in exactly one category, that item is removed from further consideration. It is sufficient, according to some embodiments of the present invention, to know to which category an item belongs without knowing the items exact ranking within the universe of items. For example, consider the task of finding the top three out of one thousand items. An item is categorized when it is known either that there are more than three items ranked before it or that there are at least nine hundred ninety-seven items ranked after it. It is not necessary to know ranking of items among the bottom nine hundred ninety-seven. After categorizing the ranked items, block 117, the program determines, at decision block 119, if all items have been categorized. If not, processing returns to block 111. Processing according to FIG. 1 continues until all items have been categorized.

It should be noted that each ranking is independently valuable to the overall classification. Each ranking result can be treated just like the initial conditions. Accordingly, the method can start by applying all of the known rankings, however many there are. Not only does this allow initial rankings to come from any number of sources and it also enables the discarding of invalid rankings without losing the work. For example, if a particular judge or ranker is later found to have a conflict of interest, and that judge was responsible for ranking a particular set of items, that judge's results can be thrown out. The method may be started again with the remaining judges' rankings. The method may suggest reranking those items, or it may suggest a different set, since more may be currently known, assuming some other judges have turned in rankings.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A computer implemented method of putting items into categories, the method comprising:
   (a) dividing a plurality of items of a data structure into a plurality of groups, wherein each group contains one or more items divided into that group;
   (b) performing a first ranking of one or more items within each group of the plurality of groups, such that each item has a set of befores and a set of afters, wherein the set of befores is a set of items ranked higher than an item, and the set of afters is a set of items ranked lower than an item;

(c) selecting, according to a what-if scoring methodology, at least one best group from the plurality of groups for a subsequent ranking, wherein the what-if scoring methodology includes determining which items from the at least one best group will yield a maximum amount of new information upon performing the subsequent ranking;

(d) performing, via processor execution, the subsequent ranking of the one or more items within the at least one best group;

(e) cascading the befores and afters of the one or more items of the at least one best group according to the subsequent ranking, wherein each item of the one or more items inherits a set of afters from each other item ranked after that item and a set of befores from each other item ranked before that item;

(f) determining which of the plurality of items are categorized, wherein an item is determined to be categorized when that item is in exactly one category;

(g) removing each categorized item of the plurality of items from the data structure, wherein each removed categorized item is removed from further consideration;

(h) in response to finding one or more invalid rankings of a subset of items:
  discarding the one or more invalid rankings of the subset of items of the plurality of items, wherein the one or more invalid rankings are associated with a particular source from a plurality of sources; and
  re-ranking the subset of items; and (i) repeating steps (c) through (g) until all of the plurality of items have been categorized.

2. The method as claimed in claim 1, wherein the what-if scoring methodology comprises:

for a pair of items i and j, calculating sets:

$$\text{Diff1} = i.\text{afters} - j.\text{afters};$$

$$\text{Diff2} = i.\text{befores} - j.\text{befores};$$

$$\text{Diff3} = j.\text{afters} - i.\text{afters}; \text{ and}$$

$$\text{Diff4} = j.\text{befores} - i.\text{befores};$$

wherein:
  Diff is a set-wise difference operator, which yields for sets A and B the elements of set A less any common elements of sets A and B, denoted as Diff(A,B)=A−B;
  i.afters is the set of afters for item i;
  j.afters is the set of afters for item j;
  i.befores is the set of befores for item i; and
  j.befores is the set of befores for item j.

3. The method as claimed in claim 2, wherein the what-if scoring methodology further comprises:

for the pair of items i and j, calculating:

$$\text{score1} = (\text{length of Diff1}) + (\text{length of Diff4}); \text{ and}$$

$$\text{score2} = (\text{length of Diff2}) + (\text{length of Diff3});$$

wherein:
  length of Diff1 is the number of items in set Diff1;
  length of Diff2 is the number of items in set Diff2;
  length of Diff3 is the number of items in set Diff3; and
  length of Diff4 is the number of items in set Diff4.

4. The method as claimed in claim 3, wherein the what-if scoring methodology is one of a pessimistic or worst case scoring methodology, the method further comprising:

for the pair of items i and j, calculating:

$$\text{minscore} = \min(\text{score1}, \text{score2}); \text{ and}$$

$$\text{maxscore} = \max(\text{score1}, \text{score2});$$

for the pair of items i and j, calculating: score(i,j)=((a first weighting factor) X minscore)+((a second weighting factor) X maxscore);

for a pair of items m and n, calculating score(m,n);
comparing score(i,j) and score(m,n); and
selecting the pair from score(i,j) and score(m,n) that has a highest score for subsequent ranking;
wherein a minscore is weighted more heavily than a maxscore.

5. The method as claimed in claim 1, wherein step (e) comprises, for each pair of items i and j:

adding item j and the set j.afters to the set i.afters, and adding item i and the set i.befores to the set j.befores, if item i is ranked before item j in the subsequent ranking; and adding item i and the set i.afters to the set j.afters, and adding item j and the set j.befores to the set i.befores, if item j is ranked before item i in the subsequent ranking;

wherein:
  i.afters is the set of afters for item i;
  j.afters is the set of afters for item j;
  i.befores is the set of befores for item i; and
  j.befores is the set of befores for item j.

6. The method as claimed in claim 1, wherein step (f) comprises for each item i:

determining if item i is guaranteed to be in the exactly one category based upon at least one of: a number of items in a set of afters for each item i, and a number of items in a set of befores for each item i.

7. The method as claimed in claim 1, wherein:
the first ranking of the one or more items is performed on only select pairs of items of the one or more items; and
step (c) comprises: randomly selecting at least one subset of pairs as the at least one best group.

8. The method as claimed in claim 1, further comprising:
in response to determining the one or more invalid rankings restarting steps (c) through (g) without the one or more invalid rankings.

9. A computer-implemented method of putting a plurality of items in a plurality of groups of a data structure into categories, wherein each item of each group is ranked within its group to define a set of befores and a set of afters for each item, the computer-implemented method comprising:

(a) selecting, according to a what-if scoring methodology, at least one best group from a plurality of groups for a subsequent ranking, wherein each group contains at one or more items divided into that group and the what-if scoring methodology includes determining which items from the at least one best group will yield a maximum amount of new information upon performing the subsequent ranking;

(b) performing, via a processor execution, the subsequent ranking of the items of the one or more items within the at least one best group;

(c) cascading the set of befores and afters of the one or more items of the at least one best group according to the subsequent ranking, wherein the set of befores is a set of items ranked before an item, and the set of afters is a set of items ranked lower than an item, and wherein each item of the one or more items inherits a set of afters from each other item ranked after that item and a set of befores from each other item ranked before that item;
(d) determining which of the items are categorized, wherein an item is determined to be categorized when that item is in exactly one category;
(e) removing each categorized item of the plurality of items from the data structure, wherein each removed categorized item is removed from further consideration;
(f) in response to finding one or more invalid rankings of a subset of items:
discarding the one or more invalid rankings of the subset of items of the plurality of items, wherein the one or more invalid rankings are associated with a particular source from a plurality of sources; and
re-ranking the subset of items; and
(g) repeating steps (a) through (e) until all of the plurality of items have been categorized.

10. The computer-implemented method as claimed in claim 9, wherein the what-if scoring methodology comprises:
for a pair of items i and j, calculating sets:

$$\text{Diff1}=i.\text{afters}-j.\text{afters};$$

$$\text{Diff2}=i.\text{befores}-j.\text{befores};$$

$$\text{Diff3}=j.\text{afters}-i.\text{afters}; \text{ and}$$

$$\text{Diff4}=j.\text{befores}-i.\text{befores};$$

wherein:
Diff is a set-wise difference operator, which yields for sets A and B the elements of set A less any common elements of sets A and B, denoted as Diff(A,B)=A−B;
i.afters is the set of afters for item i;
j.afters is the set of afters for item j;
i.befores is the set of befores for item i; and
j.befores is the set of befores for item j.

11. The computer-implemented method as claimed in claim 10, wherein the what-if scoring methodology further comprises:
for the pair of items i and j, calculating:

$$\text{score1}=(\text{length of Diff1})+(\text{length of Diff4}); \text{ and}$$

$$\text{score2}=(\text{length of Diff2})+(\text{length of Diff3});$$

wherein:
length of Diff1 is the number of items in set Diff1;
length of Diff2 is the number of items in set Diff2;
length of Diff3 is the number of items in set Diff3; and
length of Diff4 is the number of items in set Diff4.

12. The computer-implemented method as claimed in claim 11, wherein the what-if scoring methodology is one of a pessimistic or worst case scoring methodology, the method further comprising:
for the pair of items i and j, calculating:

$$\text{minscore}=\min(\text{score1, score2}); \text{ and}$$

$$\text{maxscore}=\max(\text{score1, score2});$$

for the pair of items i and j, calculating: score(i,j)=((a first weighting factor) X minscore)+((a second weighting factor) X maxscore);
for a pair of items m and n, calculating score(m,n);
comparing score(i,j) and score(m,n); and
selecting the pair from score(i,j) and score(m,n) that has a highest score for subsequent ranking;
wherein a minscore is weighted more heavily than a maxscore.

13. The computer-implemented method as claimed in claim 9, wherein step (c) comprises, for each pair of items i and j:
adding item j and the set j.afters to the set i.afters, and adding item i and the set i.befores to the set j.befores, if item i is ranked before item j in the subsequent ranking; and
adding item i and the set i.afters to the set j.afters, and adding item j and the set j.befores to the set i.befores, if item j is ranked before item i in the subsequent ranking;
wherein:
i.afters is the set of afters for item i;
j.afters is the set of afters for item j;
i.befores is the set of befores for item i; and
j.befores is the set of befores for item j.

14. The computer-implemented method as claimed in claim 9, wherein step (d) comprises for each item i:
determining if item i is guaranteed to be in the exactly one category based upon at least one of: a number of items in a set of afters for each item i, and a number of items in a set of befores for each item i.

15. The computer-implemented method as claimed in claim 9, wherein:
the first ranking of the one or more items is performed on only select pairs of items of the one or more items; and
step (c) comprises: randomly selecting at least one subset of pairs as the at least one best group.

16. The computer-implemented method as claimed in claim 9, further comprising:
in response to determining the one or more invalid rankings restarting steps (c) through (g) without the one or more invalid rankings.

* * * * *